United States Patent
Luo

(10) Patent No.: US 10,846,104 B2
(45) Date of Patent: Nov. 24, 2020

(54) APPLICATION DISPLAY METHOD AND APPARATUS, AND ELECTRONIC TERMINAL

(71) Applicant: Huawei Technologies Co., Ltd., Shenzhen (CN)

(72) Inventor: Long Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/480,969

(22) PCT Filed: Mar. 31, 2017

(86) PCT No.: PCT/CN2017/079133
§ 371 (c)(1),
(2) Date: Jul. 25, 2019

(87) PCT Pub. No.: WO2018/137287
PCT Pub. Date: Aug. 2, 2018

(65) Prior Publication Data
US 2020/0004562 A1   Jan. 2, 2020

(30) Foreign Application Priority Data
Jan. 26, 2017   (CN) .......................... 2017 1 0061852

(51) Int. Cl.
*G06F 9/451*   (2018.01)
*G06F 3/0482*   (2013.01)
*G06F 3/0484*   (2013.01)

(52) U.S. Cl.
CPC ............ *G06F 9/451* (2018.02); *G06F 3/0482* (2013.01); *G06F 3/04847* (2013.01)

(58) Field of Classification Search
CPC .............................. G06F 9/451; G06F 3/0482
(Continued)

(56) References Cited

U.S. PATENT DOCUMENTS

2010/0138784 A1*   6/2010   Colley ................ G06F 3/04883
                                                                    715/810
2011/0047488 A1   2/2011   Butin et al.
(Continued)

FOREIGN PATENT DOCUMENTS

CN   101080068 A   11/2007
CN   102609210 A   7/2012
(Continued)

OTHER PUBLICATIONS

Machine Translation and Abstract of Chinese Publication No. CN102929479, Feb. 13, 2013, 17 pages.
(Continued)

*Primary Examiner* — William D Titcomb
(74) *Attorney, Agent, or Firm* — Conley Rose, P.C.

(57) ABSTRACT

An application display method and apparatus, and an electronic terminal are provided. The method includes: displaying a first application set and a second application set on a display screen of a terminal, where the first application set is displayed in a first application display area on the display screen, the second application set is displayed in a second application display area on the display screen, and the first application display area surrounds a periphery of the second application display area; and in response to an operation of selecting a non-first application set by a user, displaying the second application set in the first application display area on the display screen; and displaying the first application set in the second application display area on the display screen.

20 Claims, 9 Drawing Sheets

(58) Field of Classification Search
USPC .......................................................... 715/762
See application file for complete search history.

(56) References Cited

U.S. PATENT DOCUMENTS

| | | | |
|---|---|---|---|
| 2013/0120447 A1 | 5/2013 | Kim et al. | |
| 2014/0181750 A1 | 6/2014 | Fujiwara | |
| 2015/0113457 A1 | 4/2015 | Li et al. | |
| 2015/0324070 A1* | 11/2015 | Kim | G06F 3/0488 715/825 |
| 2015/0331589 A1* | 11/2015 | Kawakita | G06F 1/163 715/834 |
| 2016/0034597 A1 | 2/2016 | Graf et al. | |
| 2016/0062598 A1* | 3/2016 | Kocienda | G06F 3/04817 715/765 |
| 2016/0062630 A1* | 3/2016 | Anzures | H04L 51/10 715/739 |
| 2016/0077707 A1* | 3/2016 | Guo | G06F 3/04817 715/846 |
| 2016/0085412 A1* | 3/2016 | Meganathan | G06F 3/04817 715/739 |
| 2016/0132209 A1* | 5/2016 | Abe | G06F 3/04842 715/834 |
| 2016/0259488 A1* | 9/2016 | Chan | G06F 3/0481 |
| 2018/0101290 A1* | 4/2018 | Ding | G06F 3/0485 |

FOREIGN PATENT DOCUMENTS

| | | |
|---|---|---|
| CN | 102779002 A | 11/2012 |
| CN | 102929479 A | 2/2013 |
| CN | 103197837 A | 7/2013 |
| CN | 103677498 A | 3/2014 |
| CN | 104081345 A | 10/2014 |
| CN | 104424025 A | 3/2015 |
| CN | 104965668 A | 10/2015 |
| CN | 103777869 B | 10/2016 |
| JP | 2016157392 A | 9/2016 |
| WO | 2015065402 A1 | 5/2015 |

OTHER PUBLICATIONS

Machine Translation and Abstract of Chinese Publication No. CN103197837, Jul. 10, 2013, 10 pages.
Foreign Communication From a Counterpart Application, Chinese Application No. 201780005023.3, Chinese Office Action dated Dec. 2, 2019, 11 pages.
Machine Translation and Abstract of Chinese Publication No. CN102609210, Jul. 25, 2012, 16 pages.
Machine Translation and Abstract of Chinese Publication No. CN102779002, Nov. 14, 2012, 17 pages.
Machine Translation and Abstract of Chinese Publication No. CN103777869, May 7, 2014, 15 pages.
Machine Translation and Abstract of Chinese Publication No. CN104424025, Mar. 18, 2015, 13 pages.
Machine Translation and Abstract of Chinese Publication No. CN104965668, Oct. 7, 2015, 36 pages.
Foreign Communication From a Counterpart Application, PCT Application No. PCT/CN2017/079133, English Translation of International Search Report dated Oct. 26, 2017, 2 pages.
Foreign Communication From a Counterpart Application, PCT Application No. PCT/CN2017/079133, English Translation of Written Opinion dated Oct. 26, 2017, 4 pages.
Machine Translation and Abstract of Chinese Publication No. CN101080068, Nov. 28, 2007, 42 pages.
Foreign Communication From a Counterpart Application, European Application No. 17894125.8, Extended European Search Report dated Dec. 13, 2019, 8 pages.

* cited by examiner

APPLICATION DISPLAY METHOD AND APPARATUS, AND ELECTRONIC TERMINAL

The application is a national stage of International Application No. PCT/CN2017/079133, filed on Mar. 31, 2017, which claims priority to Chinese Patent Application No. 201710061852.5, filed on Jan. 26, 2017. Both of the aforementioned applications are hereby incorporated by reference in their entireties.

TECHNICAL FIELD

This application relates to the field of communications technologies, and in particular, to an application display method and apparatus, and an electronic terminal.

BACKGROUND

With development of communications technologies, terminals can implement increasingly powerful functions, and the terminals also have increasingly diverse types.

Currently, a relatively large quantity of applications are installed on terminals of various types. Due to a limited terminal screen size, a limited quantity of applications are displayed on each screen, and screen space is not fully utilized. Consequently, efficiency of searching for an icon by a user is low. For example, a small-sized device such as a smartwatch that is currently frequently used is usually designed with a small circular screen, and approximately three applications are displayed on the small circular screen. Therefore, if the terminal does not display, on a current display screen, an application to be used by the user, the user needs to slide the screen to find the to-be-used application, and therefore cannot quickly find the to-be-used application, thereby bringing great inconvenience to the user.

SUMMARY

Embodiments of this application provide an application display method and apparatus, and an electronic terminal, so that a user can conveniently and quickly find an application.

According to a first aspect, an application display method is provided, and the method is applied to an electronic terminal. N application sets are simultaneously displayed on a display screen of the electronic terminal, where N is greater than or equal to 2, an $(N-1)^{th}$ application set in the N application sets is displayed in an $(N-1)^{th}$ application display area on the display screen, an $N^{th}$ application set in the N application sets is displayed in an $N^{th}$ application display area on the display screen, and the $(N-1)^{th}$ application display area surrounds a periphery of the $N^{th}$ application display area. The terminal obtains an operation of selecting a non-first application set by a user, and performs at least one time of cyclic switching on the N application sets for display in response to the operation of selecting the non-first application set by the user. The performing one time of cyclic switching on the N application sets for display is: displaying a first application set in the $N^{th}$ application display area, displaying a second application set in a first application display area, . . . , and displaying the $N^{th}$ application set in the $(N-1)^{th}$ application display area. In the foregoing manner of performing cyclic switching on the N application sets for display, the user can conveniently and quickly find an application.

The operation of selecting the non-first application set by the user may include one of the following cases: a selection operation performed by the user on an area in the first application display area other than a display area of a first application icon, where the first application icon is an icon corresponding to each application in the first application set; a selection operation performed by the user on a display screen area of another application icon, where the another application icon is an icon corresponding to each application in any one of the N application sets other than the first application set; a selection operation performed by the user on an application display area in N application display areas other than the first application display area; and a selection operation performed by the user on an area on the display screen other than the N application display areas.

The foregoing operation may be specifically at least one of the following operations: a tap, double-tap, triple-tap, touch and hold, or press operation of a finger on a touchscreen, and a tap or double-tap operation of a knuckle on the touchscreen: a click, double-click, triple-click, or touch and hold operation on a physical button; a slide, tap, double-tap, or press operation on a non-screen operation area on the terminal: and a preset gesture.

In a possible design, an implementation of the performing at least one time of cyclic switching on the N application sets for display in response to the operation of selecting the non-first application set by the user may include: in response to the operation of selecting the non-first application set by the user, performing one time of cyclic switching on the N application sets for display, and displaying, on the display screen, a result obtained after cyclic switching is performed; or in response to the operation of selecting the non-first application set by the user, within duration of the operation, performing continuous cyclic switching on the N application sets for display until the operation stops, and displaying, on the display screen, a result obtained after cyclic switching is performed; or in response to an operation of selecting an $M^{th}$ application set other than the first application set by the user, performing continuous cyclic switching on the N application sets for display until an icon corresponding to the $M^{th}$ application set is displayed in the first application display area, where N≥M>1.

In another possible design, the terminal displays all applications installed on the terminal on one display interface, so that all the applications installed on the terminal can be displayed on one display interface of the terminal, and the user can find a to-be-used application without performing a slide operation.

In still another possible design, application sets displayed on the display screen of the electronic terminal include the first application set and the second application set. The first application set and the second application set are simultaneously displayed on the display screen of the terminal. The first application set is displayed in the first application display area on the display screen, the second application set is displayed in a second application display area on the display screen, and the first application display area surrounds a periphery of the second application display area. In response to the operation of selecting the non-first application set by the user, the terminal displays the second application set in the first application display area on the display screen: and displays the first application set in the second application display area on the display screen, or displays the first application set in an area on the display screen other than the first application display area and the second application display area, so that the user can select, from the first application display area in which the first application set is originally displayed, an application that is in the second application set and that is to be selected by the user, and the user can conveniently and quickly find the application.

The operation of selecting the non-first application set by the user may be: a selection operation performed by the user on an area in the first application display area other than a display area of a first application icon: or a selection operation performed by the user on a display screen area of a second application icon; or a selection operation performed by the user on a non-application icon in the second application display area; or a selection operation performed by the user on the area on the display screen other than the first application display area and the second application display area. The first application icon is an icon corresponding to each application in the first application set, and the second application icon is an icon corresponding to each application in the second application set.

The first application set and the second application set may be any two of the N application sets. In an implementation, the first application set may be a $1^{st}$ application set in the N application sets, and the second application set may be any one of the N application sets other than the $1^{st}$ application set. If the operation of selecting the non-first application set by the user is the selection operation performed by the user on the display screen area of the second application icon or the selection operation performed by the user on the non-application icon in the second application display area, the second application set may be displayed in the first application display area in which the first application set is originally displayed, so that the user can quickly select a required application.

In yet another possible design, the N application sets displayed on the display screen of the terminal may be displayed in a concentric manner.

For example, application sets simultaneously displayed on the display screen of the electronic terminal include the first application set, the second application set, and a third application set. The first application set is displayed in the first application display area on the display screen, the second application set is displayed in the second application display area on the display screen, and the third application set is displayed in a third application display area on the display screen. The first application display area in which the first application set is displayed surrounds the second application display area in which the second application set is displayed, and the second application display area in which the second application set is displayed surrounds the third application display area in which the third application set is displayed, to finally produce an effect that the first application set, the second application set, and the third application set are simultaneously displayed on the display screen of the terminal in a concentric manner. In response to the operation of selecting the non-first application set, the terminal may display the second application set in the first application display area, display the third application set in the second application display area, and display the first application set in the third application display area.

According to a second aspect, an application display apparatus is provided, and the application display apparatus has a function of implementing the application display method in the first aspect. The function may be implemented by using hardware, or may be implemented by hardware executing corresponding software. The hardware or the software includes one or more modules corresponding to the foregoing function.

In a possible design, the application display apparatus includes a display unit, an interaction unit, and a processing unit, and functions of the display unit, the interaction unit, and the processing unit may be corresponding to the method steps. Details are not described herein again.

According to a third aspect, an electronic terminal is provided, and the terminal includes a processor, a memory, a display, and an input/output device. The input/output device, the display, and the memory may be connected to the processor by using a bus. The display is configured to display an application set. The input/output device is configured to obtain a user operation. The memory is configured to store program code to be executed by the processor. The processor is configured to invoke the program code stored in the memory to perform the process that is in the foregoing embodiment and that is of performing cyclic switching on the application set for display that is displayed on the display screen in response to an operation of selecting a non-first application set by a user.

According to a fourth aspect, a computer readable storage medium is provided, and the computer readable storage medium stores an instruction. When the instruction runs on a computer, the computer is enabled to perform the application display method in any one of the first aspect and the possible designs of the first aspect.

According to a fifth aspect, a computer program product including an instruction is provided. When the computer program product including the instruction runs on a computer, the computer is enabled to perform the application display method in any one of the first aspect and the possible designs of the first aspect.

According to the application display method and apparatus, and the electronic terminal provided in the embodiments of this application, the N application sets are displayed on the display screen of the electronic terminal, where N is greater than or equal to 2. The $N^{th}$ application set in the N application sets is displayed in the $N^{th}$ application display area on the display screen, and the $(N-1)^{th}$ application display area surrounds the periphery of the $N^{th}$ application display area. The electronic terminal obtains the operation of selecting the non-first application set by the user, and performs the at least one time of cyclic switching on the N application sets for display in response to the operation of selecting the non-first application set by the user. Cyclic switching is performed on the N application sets for display, so that an application set in the N application sets other than the first application set can be displayed in the first application display area. Because the first application display area is at an outermost periphery of all application display areas, a display area of the first application display area is largest. Because an icon displayed in the area may occupy more space, the icon may be displayed in a larger size, so that when selecting an application in the application set in the N application sets other than the first application set from the first application display area, the user can conveniently and quickly find and operate the application.

DESCRIPTION OF EMBODIMENTS

The following describes the embodiments of this application with reference to accompanying drawings.

An application display method provided in the embodiments of this application may be applied to an electronic terminal. The electronic terminal may also be referred to as a mobile terminal (Mobile Terminal), a mobile station (MS), user equipment (User Equipment, UE), or the like. The electronic terminal may be a device that provides voice and/or data connectivity for a user, a handheld device having a wireless connection function, or another processing device connected to a wireless modem. For example, the terminal may be a mobile phone (or referred to as a "cellular" phone) or a computer having a mobile terminal, or may be a portable, pocket-sized, handheld, computer built-in, or in-vehicle mobile apparatus. Certainly, the terminal may be a wearable device (for example, a smartwatch or a smart band), a tablet computer, a personal computer (Personal Computer, PC), a personal digital assistant (Personal Digital Assistant, PDA), or a POS (point of sale, Point of Sale).

Figure 1:
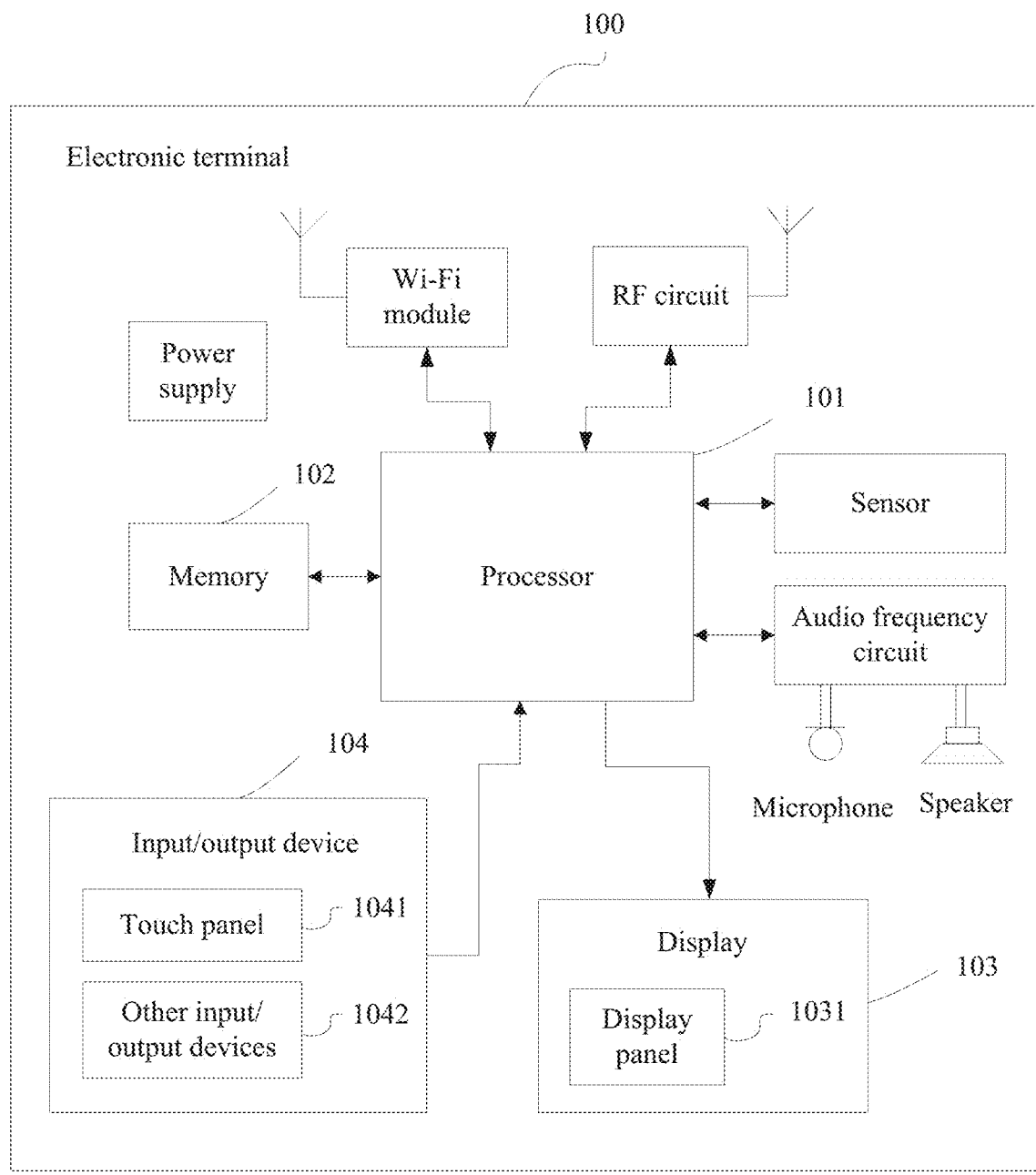
FIG. 1 is a schematic structural diagram of an electronic terminal according to an embodiment of this application.

FIG. 1 is an optional schematic structural diagram of hardware of an electronic terminal 100 according to an embodiment of this application.

As shown in FIG. 1, an internal structure of the electronic terminal 100 may include a processor 101, and a memory 102, a display 103, and an input/output device 104 that are separately connected to the processor 101. The memory 102 may be configured to store a program and data, including a program of an application displayed on the display screen 103 in this embodiment of this application. The processor 101 performs various function applications of the electronic terminal 100 and data processing by running the program stored in the memory 102, for example, performs a function of controlling an application installed on the electronic terminal 100 to be displayed on the display screen 103.

The following describes each constituent component of the electronic terminal 100 in detail with reference to FIG. 1.

The processor 101 is a control center of the electronic terminal 100, and is connected to all parts of the entire terminal by using various interfaces and lines, and performs various functions of the electronic terminal 100 and data processing by running or executing the program (or referred to as a "module") stored in the memory 102 and invoking the data stored in the memory 102, so as to perform overall monitoring on the electronic terminal 100.

Optionally, the processor 101 may include at least one processing unit. Optionally, the processor 101 may integrate an application processor and a modem processor. The application processor mainly processes an operating system, a user interface, an application program, and the like, and the modem processor mainly processes wireless communication. It may be understood that the modem processor may not be integrated into the processor 101.

The memory 102 mainly includes a program storage area and a data storage area. The program storage area may store an operating system (for example, an Android operating system, referred to as an "Android system" for short, an iOS operating system, or another operating system, where the operating system may also be referred to as a "system" for short), an application program required by at least one function (for example, a sound playing function or an image playing function), a program of at least one application in this embodiment of this application, and the like. The data storage area may store data created based on use of the electronic terminal 100, including related setting information, use status information, or the like of the application displayed on the display screen 103 in this embodiment of this application. In addition, the memory 102 may include a high-speed random access memory, and may further include a nonvolatile memory, for example, at least one magnetic disk storage device, a flash device, or another volatile solid-state storage device.

The input/output device 104 may be configured to: receive input number or character information, and generate an input instruction for key signal input related to user setting and function control of the electronic terminal 100, including an input instruction of selecting an application by a user on the terminal in this embodiment of this application. Specifically, the input/output device 104 may include a touch panel 1041 and other input/output devices 1042. The touch panel 1041, also referred to as a touchscreen, may collect a touch operation (for example, an operation performed by the user on the touch panel 1041 or near the touch panel 1041 by using any proper object or accessory, such as a finger or a stylus) performed by the user on or near the touch panel 1041, and drive a corresponding connection apparatus based on a preset program. Optionally, the touch panel 1041 may include two parts: a touch detection apparatus and a touch controller. The touch detection apparatus detects a touch orientation of the user, and detects a signal brought by the touch operation, and sends the signal to the touch controller. The touch controller receives touch information from the touch detection apparatus, converts the touch information into touch point coordinates, then sends the touch point coordinates to the processor 101, and can receive and execute a command sent by the processor 101. In addition, the touch panel 1041 may be implemented in a plurality of types, such as a resistive type, a capacitive type, an infrared ray, and a surface acoustic wave. In addition to the touch panel 1041, the input/output device 104 may include the other input/output devices 1042. Specifically, the other input/output devices 1042 may include but is not limited to one or more of a physical keyboard, a function key (such as a volume control key or an on/off key), a trackball, a mouse, a joystick, and the like.

The display 103 may be configured to display information entered by the user or information provided for the user, and various applications installed on the electronic terminal 100. The display 103 may include a display panel 1031. Optionally, the display panel 1031 may be configured by using a liquid crystal display (Liquid Crystal Display, LCD), an organic light-emitting diode (Organic Light-Emitting Diode, OLED), or the like. Further, the touch panel 1041 may cover the display panel 1031. After detecting the touch operation on or near the touch panel 1041, the touch panel 1041 sends the touch operation to the processor 101 to determine a type of a touch event, and then the processor 101 provides corresponding visual output on the display panel 1031 based on the type of the touch event. In FIG. 1, the touch panel 1041 and the display panel 1031 serve as two independent parts to implement input and output functions of the electronic terminal 100. However, in some embodiments, the touch panel 1041 and the display panel 1031 may be integrated to implement the input and output functions of the electronic terminal 100.

A person skilled in the art may understand that the internal structure of the electronic terminal 100 shown in FIG. 1 does not constitute a limitation on the terminal, and may include more or fewer parts than those shown in the figure, or may combine some parts, or have different part arrangements. For example, the electronic terminal 100 may further include an audio frequency circuit, a speaker, and a microphone that provide an audio interface between the user and the electronic terminal 100. When communicating with the outside in a wireless manner, the electronic terminal 100 may further include a radio frequency (Radio Frequency, RF) circuit and a connected antenna, a Wireless Fidelity (Wireless Fidelity, Wi-Fi) module and a connected antenna, and the like. In addition, the electronic terminal 100 further includes a sensor, a power supply that supplies power to the electronic terminal 100, and the like. Details are not described herein.

In an embodiment of this application, the display 103 displays N application sets, where N is greater than or equal to 2. An $(N-1)^{th}$ application set in the N application sets is displayed in an $(N-1)^{th}$ application display area on the display screen, an $N^{th}$ application set in the N application sets is displayed in an $N^{th}$ application display area on the display screen, and the (N-1) application display area surrounds a periphery of the $N^{th}$ application display area. The input/output device 104 obtains an operation of selecting an object other than a first application set by a user. The processor 101 invokes, by running the operating system stored in the memory 102, the program stored in the memory 102, and controls the electronic terminal 100 to perform at least one time of cyclic switching on the N application sets for display in response to the operation of selecting the object other than the first application set by the user. The performing one time of cyclic switching on the N application sets for display is: displaying a second application set in a first application display area, displaying a third application set in a second application display area, . . . , and displaying the $N^{th}$ application set in the $(N-1)^{th}$ application display area, and displaying the first application set in the $N^{th}$ application display area.

An application in this embodiment of this application is an application program installed on the terminal, is displayed on a display screen interface (for example, a display) of the terminal, can respond to a user operation, and is identified in an appearance form that can be identified by the user. The application includes but is not limited to an application icon, a widget (widget), a running control, and the like, for example, a desktop icon button, a list entry, and an album APP. An application set is a set of applications. A quantity of applications in one set needs to be greater than or equal to 1. The user can independently set an application and a quantity of applications in the application set, adjust an order of any application set in all application sets, and determine a display position of any application set on a screen.

In an embodiment of this application, the processor of the terminal may logically divide applications installed on the terminal into the N application sets. All of the N application sets are simultaneously displayed on the display screen, and N application display areas in which the N application sets are displayed may be understood as N non-overlapping application display areas obtained by the processor of the terminal through logical division. A value of N may be determined based on a quantity of applications installed on the terminal and a maximum quantity of applications that can be displayed in each application display area. For example, if 24 applications are installed on the terminal, and a maximum of eight applications can be displayed in each application display area, the value of N may be determined as 3. Certainly, quantities of applications displayed in all application display areas may be inconsistent. For example, eight applications are displayed in an application display area of an outermost circle, seven or six applications are displayed in an application display area of a second-outermost circle, five or four applications are displayed in an application display area of a third-outermost circle, and so on. The user may adjust and set a quantity of applications displayed in each application display area. This is not limited in the present invention.

In this embodiment of this application, the processor of the terminal controls the N application sets including applications installed on the terminal to be displayed in the N application display areas on the display screen. In this application, for ease of description, the N application sets and the N application display areas are defined by logically dividing applications displayed on the display screen of the terminal and application display areas. A specific processing process, for example, a process of obtaining the N application sets and the N application display areas through division, or a process of dividing application display areas on the display screen for display, is not limited in a process in which the processor of the terminal controls the applications installed on the terminal to be displayed on the display screen. However, in this application, all applications in the N application sets are simultaneously displayed on the display screen.

It should be noted that a quantity of screen display interfaces for displaying applications on the terminal is not limited in this embodiment of this application, more than one screen display interface may be set, and the application display method provided in this application may be applied to each display interface.

In this embodiment of this application, if all applications installed on the terminal are displayed on one display interface, a total quantity of applications in the N application sets displayed on one display interface of the display is a quantity of applications installed on the terminal. All the applications installed on the terminal are displayed on one display interface, so that the terminal can display all the applications installed on the terminal on one display interface, and the user can find a to-be-used application without performing a slide operation.

In this embodiment of this application, to maximize a quantity of applications displayed on each display interface, an arrangement shape obtained after applications in each of the N application sets are displayed on a display screen may be consistent with a shape of the display. For example, if the foregoing method is applied to a smartphone that is currently frequently used and that is used for voice communication, and a shape of a display of the smartphone is a rectangle, an arrangement shape obtained after applications in each of the N application sets are displayed on the display screen may be a rectangle shown in FIG. 2. If the foregoing method is applied to a small-sized device such as a smartwatch, and a shape of a display of the smartwatch is a circle, an arrangement shape obtained after applications in each of the N application sets are displayed on the display screen may be a circle shown in FIG. 3. An arrangement shape obtained after applications in each application set are displayed on a display screen may be another shape or a shape inconsistent with a shape of the display, for example, a rhombus, an ellipse, a pentagon, a hexagon, a heart shape, or a petal shape.

It should be noted that neither a quantity of applications in each of the N application sets nor a value of N is limited in this embodiment of this application, provided that N is greater than or equal to 2.

Figure 4:
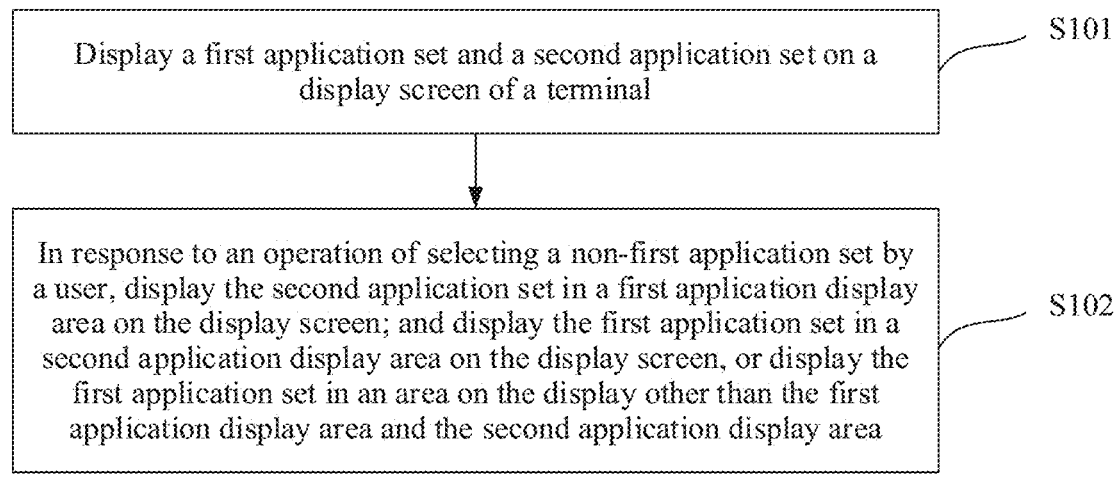
FIG. 4 is a flowchart of implementing an application display method according to an embodiment of this application.

FIG. 4 shows an application display method according to an embodiment of this application. Referring to FIG. 4, the method includes the following steps.

S101. Display a first application set and a second application set on a display screen of a terminal.

In this embodiment of this application. N application sets include the first application set and the second application set. The first application set and the second application set are simultaneously displayed on the display screen of the terminal. The first application set is displayed in a first application display area on the display screen, the second application set is displayed in a second application display area on the display screen, and the first application display area surrounds a periphery of the second application display area.

S102. In response to an operation of selecting a non-first application set by a user, display the second application set in a first application display area on the display screen; and display the first application set in a second application display area on the display screen, or display the first application set in an area on the display screen other than the first application display area and the second application display area.

In this embodiment of this application, if an application to be selected by the user is an application in the second application set, the user may perform the operation of selecting the non-first application set. A processor of the terminal detects the operation of selecting the non-first application set by the user, and displays the second application set in the first application display area on the display screen or the area on the display screen other than the first application display area and the second application display area in response to the operation of selecting the non-first application set by the user, so that the application to be selected by the user is displayed in the first application display area. The user can select, from the first application display area in which the first application set is originally displayed, the application that is in the second application set and that is to be selected by the user. Because the first application display area is at an outermost periphery of all application display areas, a display area of the first application display area is largest. Because an icon displayed in the area may occupy more space, the icon may be displayed in a larger size, so that when selecting an application in an application set in the N application sets other than the first application set from the first application display area, the user can conveniently and quickly find and operate the application.

The operation of selecting the non-first application set by the user may be: a selection operation performed by the user on an area in the first application display area other than a display area of a first application icon; or a selection operation performed by the user on a display screen area of a second application icon; or a selection operation performed by the user on a non-application icon in the second application display area; or a selection operation performed by the user on the area on the display screen other than the first application display area and the second application display area. The first application icon is an icon of an application in the first application set, and the second application icon is an icon of an application in the second application set.

The foregoing operation may be specifically at least one of the following operations: a tap, double-tap, touch and hold, or press operation on a touchscreen; a click, double-click, or touch and hold operation on a physical button: a slide, tap, double-tap, or press operation on a non-screen operation area on the terminal; and another preset gesture. The preset gesture may be a continuous or discontinuous specific track preset on the touchscreen, an air gesture, a touch or air gesture on a non-screen surface, or one or a combination of the foregoing gestures.

The first application set and the second application set may be any two of the N application sets. In an implementation, the first application set may be a $1^{st}$ application set in the N application sets, and the second application set may be any one of the N application sets other than the $1^{st}$ application set. If the operation of selecting the non-first application set by the user is the selection operation performed by the user on the display screen area of the second application icon or the selection operation performed by the user on the non-application icon in the second application display area, the second application set may be displayed in the first application display area in which the first application set is originally displayed, so that the user can quickly select a required application.

Figure 5:
FIG. 5 is an effect diagram of an operation of responding to a non-first application set according to an embodiment of this application.

In a possible implementation, in this embodiment of this application, in response to the operation of selecting the non-first application set by the user, the first application set may be displayed in the second application display area on the display screen in addition to displaying the second application set in the first application display area on the display screen, so that when an application in the first application set needs to be subsequently selected, the first application set can be re-displayed in the first application display area on the display screen in the foregoing manner. For example, the first application set is an application set that is in FIG. 3 and that is displayed in an outermost circle, and the second application set is an application set that is adjacent to the first application set and that is displayed in a second circle. In this case, in response to the operation of selecting the non-first application set by the user, the second application set is displayed in the first application display area on the display screen, the first application set is displayed in the second application display area on the display screen, and a display effect obtained after switching is shown in FIG. 5. Certainly, in this application, the first application set is not limited to the application set displayed in the outermost circle, and the first application set may be an application set displayed in the second circle. The second application set may be an application set displayed in a third circle. In this case, if a quantity of applications in an application set is relatively small, applications displayed in the first circle and the second circle on the display screen are allowed to be directly selected. It is not convenient to operate an application displayed in the third circle on the display screen because a display size is extremely small. Therefore, a switching display operation is provided, so that the application can be switched to a display position of a circle outside the third circle, and an application icon can be enlarged for display, to facilitate viewing and selection by the user. Certainly, based on a specific requirement, the first application set and the second application set may be set in another manner. Details are not described herein.

Figure 3:
FIG. 3 is another schematic diagram of displaying an application on a display screen of a terminal according to an embodiment of this application.

A specific switching display operation may be implemented in a plurality of manners. FIG. 3 is still used as an example. Some display areas corresponding to a user operation are cyclically displayed, and it is specified that a circle remains unchanged or is switched according to a non-cyclic switching rule. For example, when the user performs an operation once, a third application set is displayed in the first application display area, in other words, content of the third circle is exchanged with content of the first circle in visual. When the user performs the operation once again, content of the fourth circle is exchanged with the content of the first circle, and the content of the third circle returns to an original position, in other words, the third application set is displayed in a third application display area. The user repeatedly performs the operation until an application required by the user is displayed in the first application display area. Alternatively, it is specified that the first circle remains unchanged or the first circle and the second circle remain unchanged, and applications are sequentially switched to the second circle and the third circle. To be specific, when the user performs an operation once, the first application set is displayed in the second application display area, the second application set is displayed in a third application display area, a third application set is displayed in the first application display area, and a display position of a fourth application set remains unchanged. When the user performs the operation once again, display positions of the first application set and the second application set remain unchanged, that is, the first application set and the second application set are still respectively displayed in the second application display area and the third application display area, the fourth application set is displayed in the first application display area, the third application set is displayed in the third application display area, and a display area of another application set also remains unchanged. In addition, application sets in all circles succeeding the third circle are cyclically displayed in the first circle.

Figure 2:
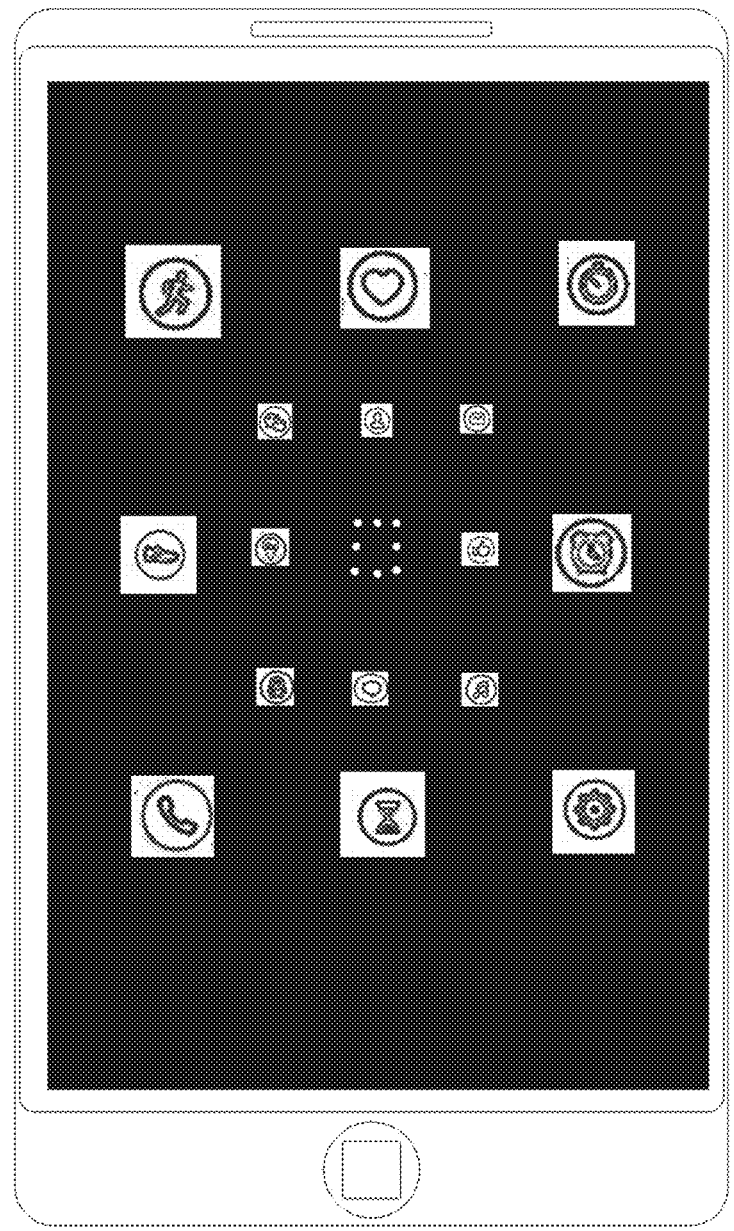
FIG. 2 is a schematic diagram of displaying an application on a display screen of a terminal according to an embodiment of this application.

It should be further noted that, in this embodiment of this application, an $(N-1)^{th}$ application display area in which an $(N-1)^{th}$ application set is displayed on the display screen of the terminal may surround, in a plurality of display manners, a periphery of an $N^{th}$ application display area in which an $N^{th}$ application set is displayed on the display screen of the terminal. FIG. 2 and FIG. 3 are described by using an example in which an arrangement shape obtained after applications in N application sets are displayed on the display screen is a concentric circle. Certainly, the arrangement shape may be not a concentric circle. This is not limited in this application.

For ease of description, this embodiment of this application is described by using an example in which the application display method provided in this application is applied to a small-sized device such as a smartwatch, and the N application sets are displayed in a concentric manner. It may be understood that displaying the N application sets in a concentric manner means that N application display areas in which the N application sets are displayed do not overlap each other in an arrangement form, and the $(N-1)^{th}$ application display area surrounds the periphery of the $N^{th}$ application display area. An expressed meaning that the N application display areas are displayed in a concentric manner is consistent with an expressed meaning that the N application sets are displayed in a concentric manner.

Figure 6:
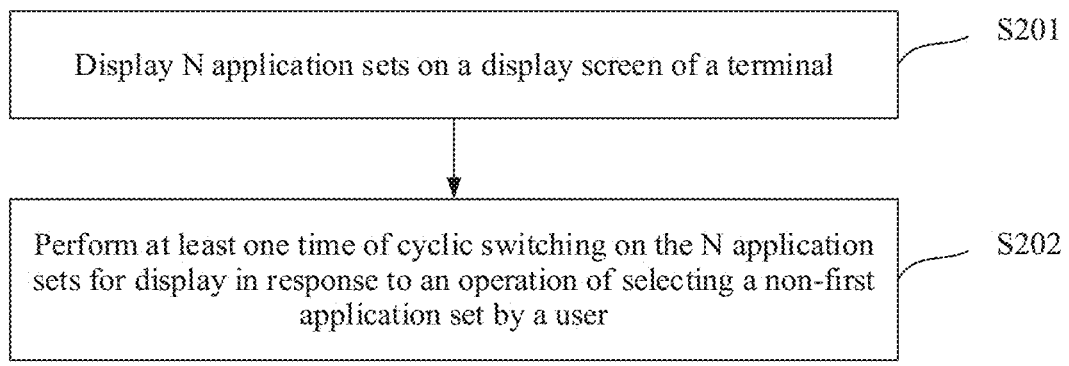
FIG. 6 is another flowchart of implementing an application display method according to an embodiment of this application.

FIG. 6 is another flowchart of implementing an application display method according to an embodiment of this application. Referring to FIG. 6, the method includes the following steps.

S201. Display N application sets on a display screen of a terminal.

In this embodiment of this application, N is greater than or equal to 2, an $(N-1)^{th}$ application set in the N application sets is displayed in an $(N-1)^{th}$ application display area on the display screen, an $N^{th}$ application set in the N application sets is displayed in an $N^h$ application display area on the display screen, and the $(N-1)^{th}$ application display area surrounds a periphery of the $N^{th}$ application display area.

Due to a limited terminal screen size, in this embodiment of this application, a size of an icon of an application in the N application sets displayed in N application display areas displayed in a concentric manner may progressively decrease from a first application display area to the $N^{th}$ application display area. An application icon displayed in the first application display area in the N application display areas is displayed in a normal icon size, and a size of an application icon displayed in a non-first application display area in the N application display areas is less than the normal icon size. An application in an application display area in the N application display areas displayed in a concentric manner other than the first application display area cannot be displayed in a normal display size of an application icon, and therefore it may be inconvenient for a user to perform view and selection operations. Therefore, in this embodiment of this application, to help the user perform the view and selection operations, an application displayed in the first application display area can be set to respond to the selection operation of the user. If an application to be selected by the user is displayed in the first application display area, the user may directly select the required application from the first application set displayed in the first application display area. If an application to be selected by the user is in the non-first application display area, the user may perform an operation of selecting a non-first application set.

S202. Perform at least one time of cyclic switching on the N application sets for display in response to an operation of selecting a non-first application set by a user.

A processor of the terminal detects the operation of selecting the non-first application set by the user, and performs the at least one time of cyclic switching on the N application sets for display in response to the operation of selecting the non-first application set by the user. The performing one time of cyclic switching on the N application sets for display is: displaying a second application set in the first application display area, displaying a third application set in a second application display area, . . . , and displaying the $N^{th}$ application set in the $(N-1)^h$ application display area, and displaying a first application set in the $N^{th}$ application display area. Cyclic switching is performed on the N application sets for display, so that an application set in the N application sets other than the first application set can be displayed in the first application display area, and the user can select an application in the application set in the N application sets other than the first application set from the first application display area.

The operation of selecting the non-first application set by the user may include one of the following cases:

a selection operation performed by the user on an area in the first application display area other than a display area of a first application icon, where the first application icon is an icon of an application in the first application set; or a selection operation performed by the user on a display screen area of another application icon, where the another application icon is an icon of an application in any one of the N application sets other than the first application set; or a selection operation performed by the user on an application display area in the N application display areas other than the first application display area: or a selection operation performed by the user on an area on the display screen other than the N application display areas.

The foregoing operation may be specifically at least one of the following operations: a tap, double-tap, touch and hold, or press operation on a touchscreen; a click, double-click, or touch and hold operation on a physical button: a slide, tap, double-tap, or press operation on a non-screen operation area on the terminal; and another preset gesture.

In this embodiment of this application, based on the operation of selecting the non-first application set by the user, in response to the operation of selecting the non-first application set by the user, the processor of the terminal may perform one time of cyclic switching on the N application sets for display, and display, on the display screen, a result obtained after cyclic switching is performed; or in response to the operation of selecting the non-first application set by the user, within duration of the operation, perform continuous cyclic switching on the N application sets for display until the operation stops, and display, on the display screen, a result obtained after cyclic switching is performed; or in response to an operation of selecting an $M^{th}$ application set other than the first application set by the user, perform continuous cyclic switching on the N application sets for display until an icon corresponding to the $M^{th}$ application set is displayed in the first application display area, where $N \geq M > 1$. In response to the operation of selecting the non-first application set by the user, the processor of the terminal may perform the at least one time of cycle switching on the N application sets for display in a plurality of implementations. For example, in response to an operation, the processor of the terminal performs one time of cyclic switching on the N application sets for display. Alternatively, within duration of an operation, the processor of the terminal may perform continuous cyclic switching on the N application sets for display until the operation stops. Alternatively, if the operation of selecting the non-first application set by the user is the selection operation performed by the user on the display screen area of the another application icon (an icon corresponding to each application in any one of the N application sets other than the first application set), the processor of the terminal may perform continuous cyclic switching on the N application sets for display until an application icon selected by the user is displayed in the first application display area. Alternatively, if the operation of selecting the non-first application set by the user is the selection operation performed by the user on the application display area in the N application display areas other than the first application display area, the processor of the terminal may perform continuous cyclic switching on the N application sets for display until an application icon that is in the application display area and that is selected by the user is displayed in the first application display area.

The following uses an example to describe the implementation in which the at least one time of cyclic switching is performed on the N application sets for display in response to the operation of selecting the non-first application set by the user.

In an implementation, if the operation of selecting the non-first application set by the user is a selection operation of taping a display area of another application icon, each time detecting one tap operation, the processor of the terminal performs one time of cyclic switching on the N application sets for display. The user can perform a plurality of tap operations until an application icon selected by the user is displayed in the first application display area, and the user selects the required application icon from the first application display area.

In another implementation, if the operation of selecting the non-first application set by the user is a selection operation of taping the display area of the another application icon, the processor of the terminal may perform continuous cyclic switching on the N application sets for display until an application icon selected by the user is displayed in the first application display area. Certainly, the processor of the terminal may directly display, in the first application display area without performing a plurality of times of cyclic switching for display, an application set in which the application icon selected by the user is located, provided that the application icon selected by the user is displayed in the first application display area, and the user selects the required application icon from the first application display area.

In still another implementation, if the operation of selecting the non-first application set by the user is a selection operation of touching and holding the area on the display screen other than the N application display areas, after detecting a touch and hold operation of the user, within duration of the touch and hold operation, the processor of the terminal performs continuous cyclic switching on the N application sets for display, and stops performing cyclic switching on the N application sets for display after detecting that the touch and hold operation of the user ends. For example, when selecting an application from the non-first application set, the user may perform a touch and hold operation, and cyclic switching is performed on the N application sets for display. When an application icon selected by the user is displayed in the first application display area, the user stops a press operation. In this case, the application icon selected by the user is displayed in the first application display area. Because the first application display area is at an outermost periphery of all application display areas, a display area of the first application display area is largest. Because an icon displayed in the area may occupy more space, the icon may be displayed in a larger size, so that when selecting an application in an application set in the N application sets other than the first application set from the first application display area, the user can conveniently and quickly find and operate the application. If the user selects an application icon, the application icon may be further displayed in a selected state.

In this embodiment of this application, with reference to actual application, the following describes a process in which the application display method is applied to a smartwatch to implement application display.

Figure 7:
FIG. 7 is a schematic diagram of a smartwatch to which an application display method is applied according to an embodiment of this application.

FIG. 7 is a schematic diagram of a smartwatch. A user touches a crown button (a position circled by a circle in FIG. 7) on the right of the smartwatch to enter a desktop launcher (launcher), in other words, enter a display interface of the smartwatch. A shape of a display of the smartwatch is a circle. In this application, an arrangement shape obtained after N application sets are displayed on the display screen of the smartwatch is set to be consistent with the shape of the display of the smartwatch, and is also set as a circle. As shown in FIG. 3, applications installed on the smartwatch are in a circular layout, and are displayed in a manner of N concentric circles.

In FIG. 3, a value of N is 3. Three application sets are simultaneously displayed on the display screen in a concentric manner, and are a first application set, a second application set, and a third application set from the outside to the inside. The first application set is displayed in a first application display area on the display screen, the second application set is displayed in a second application display area on the display screen, and the third application set is displayed in a third application display area on the display screen. The first application display area in which the first application set is displayed surrounds the second application display area in which the second application set is displayed, and the second application display area in which the second application set is displayed surrounds the third application display area in which the third application set is displayed, to finally produce an effect that the first application set, the second application set, and the third application set are displayed in a concentric manner.

Figure 8:
FIG. 8 is another effect diagram of an operation of responding to a non-first application set according to an embodiment of this application.

In FIG. 3, a quantity of applications in each application set is set to 8, and eight applications in the first application set all can respond to a selection operation of the user. If the first application set includes an application required by the user, the user may directly select the required application from the first application set. If the first application set does not include the application required by the user, the user may switch, by performing the foregoing operation of selecting a non-first application set, for example, an operation of tapping or touching and holding an area on the display screen of the smartwatch other than a display area of a first application icon, the application to be selected by the user to the first application display area for selection. For example, if the user performs one tap operation on the area on the display screen interface of the smartwatch other than the display area of the first application icon, as shown in FIG. 8, an application in the second application set is displayed in the first application display area in which the first application set is originally displayed, the third application set is displayed in the second application display area in which the second application set is originally displayed, and the first application set is displayed in the third application display area in which the third application set is originally displayed. After the user performs one tap operation, if the application required by the user is still not displayed in the first application display area in which the first application set is originally displayed, the user may continue to perform a tap operation on the area on the display screen interface of the smartwatch other than the display area of the first application icon. Each time the user performs one tap operation, cyclic switching may be performed on the N application sets on the display screen interface of the smartwatch for display once again in the foregoing manner, and the user stops the tap operation after the user finds, in the first application display area in which the first application set is originally displayed, the application required by the user.

It should be noted that a process in which the user performs the operation of selecting the non-first application set on the smartwatch, and in response to the operation of selecting the non-first application set, the smartwatch performs at least one time of cyclic switching on the N application sets for display may be implemented in a plurality of manners, and is not limited to the manner described above. For example, the user may further perform a touch and hold operation. In a process of the touch and hold operation, continuous cyclic switching is performed, in the foregoing manner, on the N application sets simultaneously displayed on the display screen interface of the smartwatch for display. The user finds, in the first application display area in which the first application set is originally displayed, the application required by the user, and the user stops the touch and hold operation. Cyclic switching performed on the N application sets on the display screen interface of the smartwatch for display stops. An application set displayed in the first application display area in which the first application set is originally displayed includes the application required by the user.

It may be understood that, to implement the foregoing functions, the terminal includes corresponding hardware structures and/or software modules for performing the functions. With reference to units and algorithm steps of each example described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions of the embodiments of this application.

In the embodiments of this application, function unit division may be performed on the terminal based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that the unit division in the embodiments of this application is an example and is merely logical function division. There may be another division manner during actual implementation.

Figure 9:
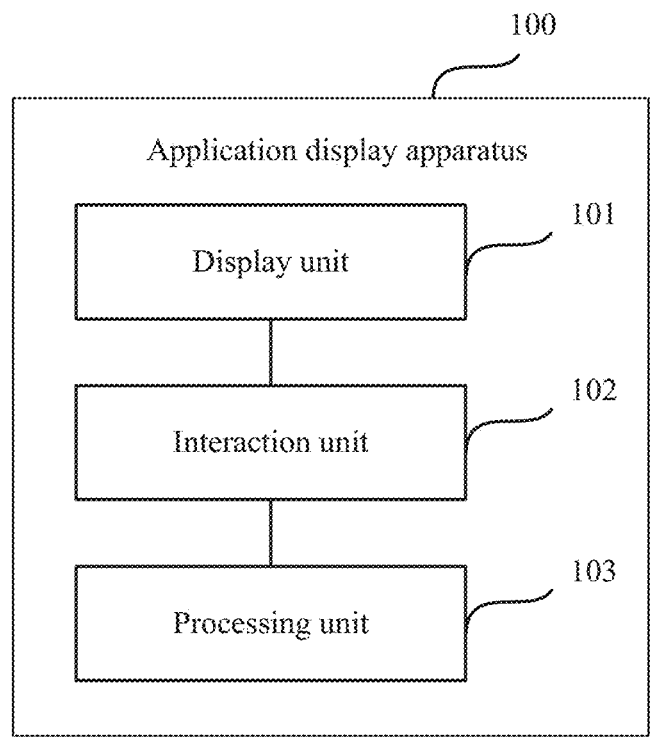
FIG. 9 is a schematic structural diagram of an application display apparatus according to an embodiment of this application.

When an integrated unit is used, FIG. 9 is a schematic structural diagram of an application display apparatus. Referring to FIG. 9, an application display apparatus 100 is applied to an electronic terminal, and includes a display unit 101, an interaction unit 102, and a processing unit 103. The display unit 101 is configured to display a first application set and a second application set on a display screen of the terminal, where the first application set is displayed in a first application display area on the display screen, the second application set is displayed in a second application display area on the display screen, and the first application display area surrounds a periphery of the second application display area. The interaction unit 102 is configured to receive a user operation. The processing unit 103 is configured to: in response to an operation of selecting a non-first application set by a user, by using the display unit 101, display the second application set in the first application display area on the display screen; and display the first application set in the second application display area on the display screen, or display the first application set in an area on the display screen other than the first application display area and the second application display area.

Figure 10:
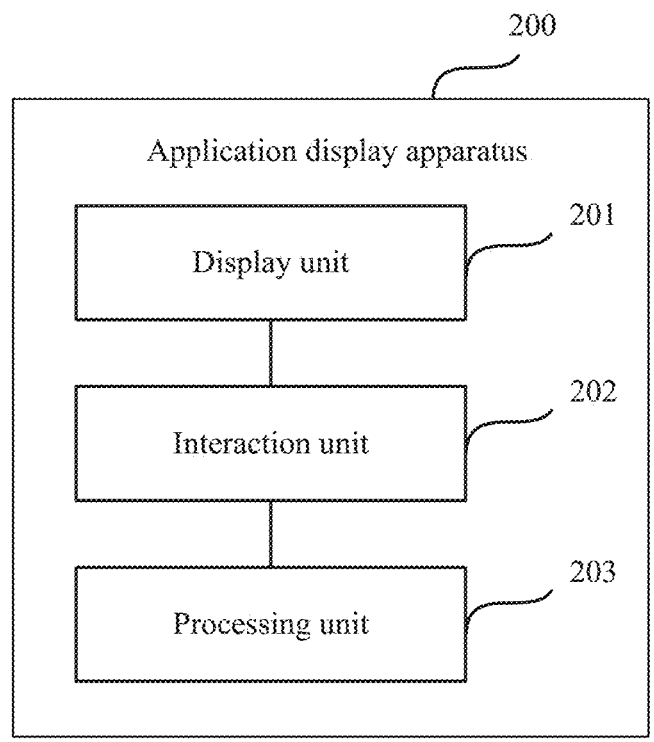
FIG. 10 is another schematic structural diagram of an application display apparatus according to an embodiment of this application.

When an integrated unit is used, FIG. 10 is a schematic structural diagram of an application display apparatus. Referring to FIG. 10, an application display apparatus 200 is applied to a terminal, and includes a display unit 201, an interaction unit 202, and a processing unit 203. The display unit 201 is configured to display N application sets on a display screen of the terminal, where N is greater than or equal to 2, an $(N-1)^{th}$ application set in the N application sets is displayed in an $(N-1)^{th}$ application display area on the display screen, an $N^{th}$ application set in the N application sets is displayed in an $N^{th}$ application display area on the display screen, and the $(N-1)^{th}$ application display area surrounds a periphery of the $N^{th}$ application display area. The interaction unit 202 is configured to receive a user operation. The processing unit 203 is configured to perform at least one time of cyclic switching on the N application sets for display by using the display unit 201 in response to an operation of selecting a non-first application set by a user. The performing one time of cyclic switching on the N application sets for display is specifically: displaying a first application set in the $N^{th}$ application display area, displaying a second application set in a first application display area . . . , and displaying the $N^{th}$ application set in the $(N-1)^{th}$ application display area.

In a possible implementation, the N application sets are displayed on the display screen of the terminal in a concentric manner.

In a possible implementation, in response to the operation of selecting the non-first application set by the user, the processing unit 203 performs the at least one time of cyclic switching on the N application sets for display in the following manner:

in response to the operation of selecting the non-first application set by the user, performing one time of cyclic switching on the N application sets for display, and displaying, on the display screen, a result obtained after cyclic switching is performed; or in response to the operation of selecting the non-first application set by the user, within duration of the operation, performing continuous cyclic switching on the N application sets for display until the operation stops, and displaying, on the display screen, a result obtained after cyclic switching is performed; or in response to an operation of selecting an $M^{th}$ application set other than the first application set by the user, performing continuous cyclic switching on the N application sets for display until an icon corresponding to the $M^{th}$ application set is displayed in the first application display area, where $N \geq M > 1$.

It should be noted that the application display apparatus 100 and the application display apparatus 200 provided in the embodiments of this application have all functions for implementing the application display method processes in the foregoing method embodiments. For specific implementation processes of the application display apparatus 100 and the application display apparatus 200, refer to related descriptions in the foregoing embodiments and the accompanying drawings. Details are not described herein again.

When a form of hardware is used, the display unit may be a display, the interaction unit may be an input/output device, and the processing unit may be a processor. The input/output device may be a touchscreen, a physical button, various sensors such as a pressure sensor, a touch sensor, a range sensor, an infrared sensor, and a light sensor, a sound capture apparatus, or an image capture apparatus such as a microphone or a camera. The user may operate the apparatus by using the interaction unit, to control the apparatus to execute a user command and run a specific function. If the display unit is the display, the interaction unit is the input/output device, and the processing unit is the processor, the application display apparatus may be the terminal shown in FIG. 1. The terminal includes a processor, a memory, a display, and an input/output device. The display, the input/output device, and the memory all are connected to the processor by using a bus. The display is configured to display an application set. The input/output device is configured to obtain an operation of selecting a non-first application set by a user. The memory is configured to store program code to be executed by the processor. The processor is configured to invoke the program code stored in the memory to perform the process that is in the foregoing embodiment and that is of performing switching on the application set for display that is displayed on the display screen in response to the operation of selecting the non-first application set by the user.

For a process of displaying an application by the terminal, refer to an application display implementation process described in the foregoing embodiment. Details are not described herein again.

An embodiment of this application further provides a computer readable storage medium, and the computer readable storage medium stores an instruction. When the instruction runs on a computer, the computer is enabled to perform the application display method in the foregoing embodiment.

An embodiment of this application further provides a computer program product including an instruction. When the computer program product including the instruction runs on a computer, the computer is enabled to perform the application display method in the foregoing embodiment.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. An application display method, applied to an electronic terminal and comprising:
    displaying a first application set and a second application set on a display screen of the terminal, wherein the first application set is displayed in a first application display area on the display screen, the second application set is displayed in a second application display area on the display screen, and the first application display area surrounds the second application display area;
    receiving a selection operation of an application set other than the first application set;
    displaying the second application set in the first application display area in response to the selection operation;
    displaying the first application set in the second application display area or displaying the first application set in an area on the display screen other than the first application display area and the second application display area, in response to the selection operation;
    displaying a third application set in a third application display area on the display screen, wherein the second application display area surrounds the third application display area; and
    performing at least one instance of cyclic switching on the first application set, the second application set, and the third application set for display in response to input by a user, wherein performing the at least one instance comprises displaying a first application set in the third application display area, displaying a second application set in a first application display area, and displaying the third application set in the second application display area.

2. The method of claim 1, wherein the selection operation is (a) in an area in the first application display area other than a display area of a first application icon, (b) on a display screen area of a second application icon, (c) on a non-application icon in the second application display area, or (d) on an area on the display screen other than the first application display area and the second application display area, wherein the first application icon corresponds to each selectable application in the first application set, and wherein the second application icon corresponds to each selectable application in the second application set.

3. The method of claim 1, further comprising displaying the first application set, the second application set, and the third application set on the display in a concentric manner.

4. The method of claim 1, wherein the performing further comprises displaying, on the display screen, a result obtained after cyclic switching.

5. The method of claim 1, wherein the performing further comprises:
    performing, within a duration of the selection operation, continuous cyclic switching on the first application set, the second application set, and the third application set until the selection operation stops; and
    displaying, on the display screen, a result obtained after the continuous cyclic switching stops.

6. The method of claim 1, wherein the performing further comprises:
    displaying a first application set in the third application display area, displaying a second application set in a first application display area, displaying the third application set in the second application display area; and then
    displaying a second application set in the third application display area, displaying a third application set in a first application display area, and displaying the first application set in the second application display area.

7. The method of claim 1, wherein the selection operation comprises, a tap, double-tap, triple-tap, touch and hold, or press operation, on a displayed icon.

8. An electronic terminal comprising:
    a display screen configured to:
        display a first application set in a first application display area;
        display a second application set in a first application display area, wherein the first application display area surrounds the second application display area;
    an input/output device configured to obtain a selection operation input selecting an application set other than the first application set;
    a memory configured to store program code to be executed by a processor; and
    a processor operatively coupled to the display screen, input/output device, and memory, and configured to invoke the program code stored in the memory to perform the following functions:
        receive a selection operation selecting an application set other than the first application set;
        display the second application set in the first application display area in response to the selection operation;
        display the first application set in the second application display, or display the first application set in an area on the display screen other than the first application display area and the second application display area, in response to the selection operation;
        display a third application set in a third application display area on the display screen, wherein the second application display area surrounds a periphery of the third application display area;
        display the second application set in the first application display area;
        display the first application set in the second application display area, or display the first application set in an area on the display screen other than the first application display area and the second application display area, in response to a selection operation; and
        perform at least one instance of cyclic switching on the first application set, second application set, and third application set for display in response to a selection operation, wherein the at least one instance of cyclic switching on the first, second and third application sets for display comprises displaying a first application set in the third application display area, displaying a second application set in a first application display area, and displaying the third application set in the second application display area.

9. The electronic terminal of claim 8, wherein the selection operation is (a) in an area in the first application display area other than a display area of a first application icon, (b) on a display screen area of a second application icon, (c) on a non-application icon in the second application display area, or (d) on an area on the display screen other than the first application display area and the second application display area, wherein the first application icon corresponds to each selectable application in the first application set, and wherein the second application icon corresponds to each selectable application in the second application set.

10. The electronic terminal of claim 8, wherein the first, second and third application sets are displayed on the display screen of the terminal in a concentric manner.

11. The electronic terminal of claim 8, wherein the display screen is further configured to display a result obtained after cyclic switching.

12. The electronic terminal of claim 8, wherein the display screen is further configured to:
  perform, within a duration of the selection operation, continuous cyclic switching on the first application set, the second application set, and the third application set until the selection operation stops; and
  display a result obtained after the continuous cyclic switching stops.

13. The electronic terminal of claim 8, wherein the display screen is further configured to:
  display a first application set in the third application display area, display a second application set in a first application display area, display the third application set in the second application display area; and then
  display a second application set in the third application display area, display a third application set in a first application display area, and display the first application set in the second application display area.

14. The electronic terminal of claim 8, wherein the selection operation comprises, a tap, double-tap, triple-tap, touch and hold, or press operation, on a displayed icon.

15. A computer program product comprising computer-executable instructions stored on a non-transitory computer-readable medium that, when executed by a processor, cause an apparatus to:
  display a first application set and a second application set on a display screen of a terminal, wherein the first application set is displayed in a first application display area on the display screen, the second application set is displayed in a second application display area on the display screen, and the first application display area surrounds the second application display area;
  receive a selection operation of an application set other than the first application set;
  display the second application set in the first application display area in response to the selection operation;
  display the first application set in the second application display area or displaying the first application set in an area on the display screen other than the first application display area and the second application display area in response to the selection operation;
  display a third application set in a third application display area on the display screen, wherein the second application display area surrounds the third application display area; and
  perform at least one instance of cyclic switching on the first application set, the second application set, and the third application set for display in response to input by a user, wherein the performing comprises displaying a first application set in the third application display area, displaying a second application set in a first application display area, and displaying the third application set in the second application display area.

16. The computer program product of claim 15, wherein the selection operation is (a) in an area in the first application display area other than a display area of a first application icon, b) on a display screen area of a second application icon, (c) on a non-application icon in the second application display area, or (d) on an area on the display screen other than the first application display area and the second application display area, wherein the first application icon corresponds to each selectable application in the first application set, and wherein the second application icon corresponds to each selectable application in the second application set.

17. The computer program product of claim 15, wherein the performing further comprises displaying, on the display screen, a result obtained after cyclic switching.

18. The computer program product of claim 15, wherein the performing further comprises:
  performing, within a duration of the selection operation, continuous cyclic switching on the first application set, the second application set, and the third application set until the selection operation stops; and
  displaying, on the display screen, a result obtained after the continuous cyclic switching stops.

19. The computer program product of claim 15, wherein the performing further comprises:
  displaying a first application set in the third application display area, displaying a second application set in a first application display area, displaying the third application set in the second application display area; and then
  displaying a second application set in the third application display area, displaying a third application set in a first application display area, and displaying the first application set in the second application display area.

20. The computer program product of claim 15, wherein the selection operation comprises, a tap, double-tap, triple-tap, touch and hold, or press operation, on a displayed icon.

* * * * *

UNITED STATES PATENT AND TRADEMARK OFFICE
CERTIFICATE OF CORRECTION

PATENT NO. : 10,846,104 B2  
APPLICATION NO. : 16/480969  
DATED : November 24, 2020  
INVENTOR(S) : Long Luo Page 1 of 1

It is certified that error appears in the above-identified patent and that said Letters Patent is hereby corrected as shown below:

In the Claims

Claim 16, Column 22, Line 16: "icon, b)on a display" should read "icon, (b)on a display"

Signed and Sealed this  
Twelfth Day of January, 2021

Andrei Iancu  
*Director of the United States Patent and Trademark Office*